Oct. 25, 1932.　　　　T. WARDLEY　　　　1,884,427
GLASS FEEDING APPARATUS
Filed May 21, 1927
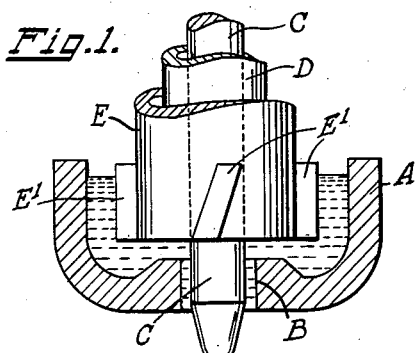
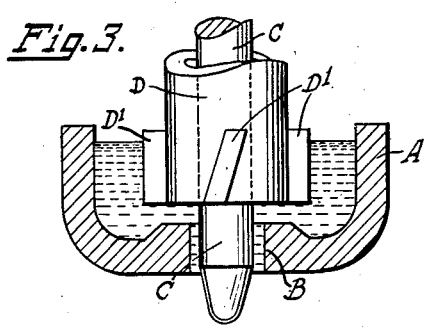
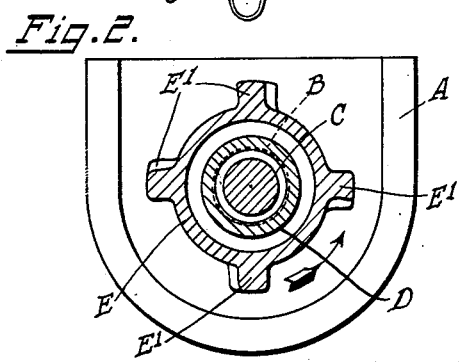
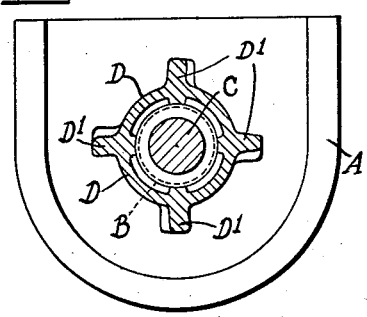
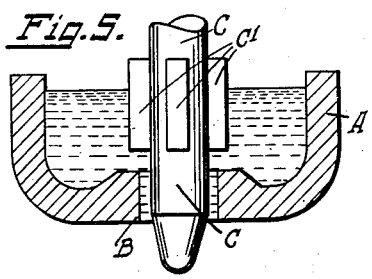
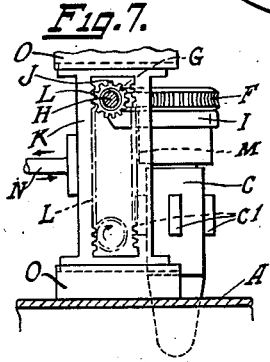
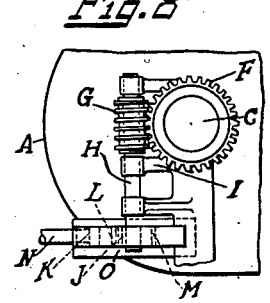
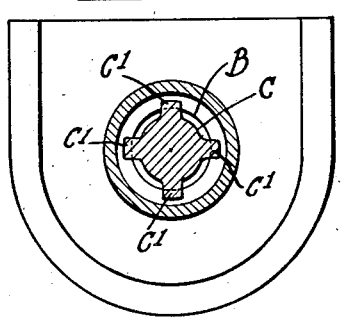
Witness:
J. J. White
Inventor
Thomas Wardley
by Robson D. Brown
Attorney Patented Oct. 25, 1932

1,884,427

UNITED STATES PATENT OFFICE

THOMAS WARDLEY, OF GREENFORD, ENGLAND, ASSIGNOR TO HARTFORD-EMPIRE COMPANY, OF HARTFORD, CONNECTICUT, A CORPORATION OF DELAWARE

GLASS FEEDING APPARATUS

Application filed May 21, 1927, Serial No. 193,110, and in Great Britain June 18, 1926.

My invention relates generally to the art of feeding molten glass and more particularly to improvements in glass feeders of that type having a container for molten glass, such as a forehearth connected to a tank furnace, provided with a discharge outlet in its bottom and having glass mixing and impelling means acting on the glass in the container.

An object of the invention is the provision in a glass feeder of the character described of improved means for causing a relatively great and effective mixing action on the glass in the container without preventing regulation over a relatively wide range of the weight of masses of glass discharged successively from the container through its outlet and of the shape of such masses while they are suspended from the outlet.

A further object of the invention is the provision in a glass feeder of the character described of simple, reliable and efficient means for making use of the force resulting from the vertical reciprocation of an implement in the glass within the container to cause simultaneous movement of glass in the container in a plane at a right angle, or substantially at a right angle, with the axis of the reciprocating member to effect thorough mixing of the glass in the container and to render the same homogeneous.

Other objects and advantages of the invention will be apparent from the following description, when considered in conjunction with the accompanying drawing:

According to this invention, the improved means for moving or disturbing the molten glass in the receptacle are such as to impel or push the molten glass in a positive manner in a plane at a right angle or substantially at a right angle to the axis of the discharge opening in the said container or receptacle. The said impelling or pushing means may comprise a plurality or series of projections, vanes, fins or the like on a rotatable or angularly movable part or member and so formed and disposed that sufficient space is provided between the projections or the like to enable each of them to push the molten glass in front of it during its rotation or movement in the receptacle so that a positive impelling or pushing movement of the molten glass is effected in a plane at a right angle or substantially at a right angle to the axis of the discharge opening to cause a general disturbance or stirring of the molten glass in the receptacle. The rotatable member carrying the aforesaid impelling or pushing means may be constituted by an existing part such as the plunger or the weight regulating or flow controlling tube or it may be an additional part. It is generally preferred to provide a rotatable or angularly movable member with the impelling or pushing means thereon for operating with a stationary receptacle but if desired the receptacle itself may be provided with impelling or pushing means and it may be rotatable or angularly movable for positively moving or pushing the molten glass in a plane at a right angle to the axis of the discharge opening as aforesaid. Any suitable means may be provided for effecting the rotary or angular movement of the impelling means and the movement may be continuous, intermittent or oscillatory.

In order that the invention may be clearly understood and readily carried into effect, the same will now be described more fully with reference to the accompanying drawing, in which:—

Figures 1 and 2 respectively represent a vertical sectional view and a sectional plan view of one construction of the apparatus according to this invention in which the impelling means are provided on a rotatable or angularly movable tube located around and concentric with a weight regulating or flow controlling tube and a vertically movable plunger.

Figures 3 and 4 are views respectively similar to Figures 1 and 2, illustrating a construction in which the impelling means are provided on a weight regulating or flow controlling tube located around the plunger.

Figures 5 and 6 are views respectively similar to Figures 1 and 2 illustrating the impelling means provided on the plunger.

Figures 7 and 8 are respectively an elevation and a plan of one construction of mechanism for imparting reciprocation as well as rotation to a member provided with the impelling means.

A represents the receptable which may be the boot, forehearth or extension of a tank furnace from which the molten glass is supplied to the said receptacle. B indicates the discharge opening in the lower part of the said receptacle. C indicates the plunger or needle which may be vertically moved or reciprocated by any appropriate or usual means for operating in or controlling the discharge opening B in any known manner. In Figures 1 to 4, D represents a weight regulating or flow controlling tube or sleeve surrounding the plunger C for regulating the flow of the molten glass to the discharge opening B and therefore the weight of the discharged masses or gobs as described in the specification of British patent No. 194,675 to Hartford-Empire Company and another.

In the example illustrated in Figures 1 and 2, a tube or sleeve E surrounds the weight regulating tube D with its lower end dipping into the molten glass contained in the receptacle A. At the lower part of the tube E, a series of spaced projections E' are provided so as to be immersed in the molten glass, the said projections being such and so disposed that each of them is capable of pushing the molten glass and displacing the same when moved in a plane at a right angle to the axis of the discharge opening. Any suitable means may be provided for rotating or angularly moving the said tube E and as a result of imparting rotation to this tube, the projections E' thereon push or impel the molten glass in a plane at a right angle or substantially at a right angle to the axis of the discharge opening B so that the molten glass within the receptacle is positively moved as distinct from being moved due to adhesion or friction as in apparatus such as heretofore provided and is therefore more effectively disturbed and maintained in a condition which renders the glass uniform and homogeneous as regards temperature, quality and consistency. The plunger C and the weight regulating tube D within the said tube E may be operated in any suitable or usual manner.

In the example illustrated in Figures 3 and 4 the aforesaid tube E with the impelling means E' shown in Figures 1 and 2, is dispensed with and the weight regulating tube D (or any other tube) around the plunger C is provided at its lower end with a series of spaced projections D' which are similar to the projections E' shown in Figures 1 and 2 and which when the tube D is rotated in any suitable manner impel or push the molten glass so as to impart positive movement to the glass in the receptacle in a direction at a right angle or substantially at a right angle to the axis of the discharge opening B. A rotary tube with projections at its lower part for impelling or pushing the molten glass may be used in apparatus where a plunger is not employed. Interior projections or impelling means may be provided on a rotatable or angularly movable tube or sleeve if desired, or the tube may be formed with spaces that are such as to leave depending parts that dip into the molten glass and constitute the impelling means or projections. One advantage of the tube E with the impelling means E' is that it may be axially moved or adjusted during working if desired, for enabling the impelling movement to be imparted at any required depth in the molten glass.

In the example illustrated in Figures 5 and 6 the impelling means are provided on the plunger itself and no surrounding tube is employed but such a tube may be provided if desired. In this example a series of spaced projections C' are provided on the plunger C at a position to enable them to extend into the molten material without interfering with the reciprocation or vertical movement of the plunger as required during the feeding or flow of the molten glass from the receptacle through the discharge opening B. These projections or vanes may terminate in a plane that is located a substantial distance above the limit of downward movement of the plunger in any given adjustment and the vanes therefore may extend radially beyond the wall of the outlet and be adapted to cause rotative movement and thorough mixing of a relatively large portion of the glass in the container without preventing movement of the lower end of the plunger into or through the outlet as may be required to accurately and regulably control the weight of successive masses of glass discharged through the outlet and the shape of the masses of glass suspended from the outlet before mold charges have been severed therefrom. The impelling projections in any of the examples referred to may be inclined as shown in Figures 1 to 4, or they may be vertical or parallel with the axis of the discharge opening as shown in Figures 5 and 6, and the member having the inclined or vertical projection may be rotated in either direction.

When the member provided with the impelling means is adapted to be reciprocated or vertically moved in addition to being rotated, as for instance in the case of the plunger shown in Figures 5 and 6, means may be provided whereby the reciprocatory movement causes the rotation of the member or plunger having the impelling means; an example of such means is illustrated in Figures 7 and 8 wherein the plunger C having the impelling means C' is provided with a worm wheel or ring F that is engaged by a worm G on a spindle H supported in bearings I carried by the plunger. The said spindle has secured thereto a pinion J disposed in a vertical slot in a frame K between oppositely disposed racks L and M. The said frame K is adapted to be moved in opposite directions, for example by means of a rod N, (see Figure 7) so that one or the other of the said racks L and M can be moved into engagement with the aforesaid pinion J. As the plunger C descends, the pinion J is in engagement with the rack L with the result that during this downward movement the plunger is rotated by means of the said pinion and worm gearing. Upon the plunger reaching the end of its downward movement the frame K is moved in order to bring the other rack M into engagement with the opposite side of the pinion J so that the latter in being moved upwardly with the plunger enables the rotation of the plunger to be continued during its upward movement. By such a construction, the impelling means push or positively move the glass in a plane at a right angle to the axis of the discharge opening B of the receptacle A as aforesaid during the reciprocation of the plunger. In any of the examples hereinbefore referred to the impelling members, projections or the like may be adjustable, if desired for varying the depth or extent to which they enter the molten glass so as to enable the impelling movement to be imparted at different depths.

Having now particularly described and ascertained the nature of my said invention and in what manner the same is to be performed, I declare that what I claim is:—

1. In glass feeding apparatus, a glass container having a submerged outlet, a plunger movable in the glass toward and from the outlet, a regulating tube surrounding said plunger and extending into the glass for controlling flow of glass to the outlet, and a rotary or angularly movable tube surrounding said regulating tube and having a portion extending into the glass and provided with radial projections adapted to move glass in the container in a plane substantially at a right angle to the axis of the outlet when said last named tube is rotated or moved angularly about its axis.

2. In glass feeding apparatus, a glass container having a submerged outlet, a plunger movable in the glass toward and from the outlet, a regulating tube surrounding said plunger and extending into the glass for controlling flow of glass to the outlet, and a rotary or angularly movable tube surrounding said regulating tube and having a portion extending into the glass and provided with radial projections adapted to move glass in the container in a plane substantially at a right angle to the axis of the outlet when said last named tube is rotated or moved angularly about its axis, said projections extending in the general direction of the length of said last named tube.

3. In glass feeding apparatus, a glass container having a submerged discharge passage terminating at its lower end in an orifice, a rotary implement extending into the glass in substantially axial alignment with the discharge passage, and a plurality of peripherally spaced outstanding projections on the portion of the implement which extends into the glass for moving glass in the container in a plane substantially at a right angle with the axis of the implement when the implement is moved angularly about its axis, said projections extending radially from the implement beyond the wall of the adjacent end portion of said discharge passage.

4. In glass feeding apparatus, a glass container having a submerged discharge passage terminating at its lower end in an orifice, an implement movable toward and from the orifice for regulating discharge of glass through said orifice, and means extending radially from the implement beyond the wall of the adjacent end portion of said discharge passage and actuated by an axial movement of the implement to move glass in the container in a plane substantially at right angles with the axis of said orifice.

5. In glass feeding apparatus, a glass container having a submerged discharge passage terminating at its lower end in an orifice, an impeller movable axially in the glass toward and from the orifice, and means extending beyond the wall of the adjacent end of the discharge passage and actuated in response to an axial movement of the impeller to set up a force in the glass moving in a plane substantially at a right angle with the axis of the impeller.

6. In glass feeding apparatus, a glass container having a submerged outlet, axially and angularly movable flow regulating means extending into the glass toward the outlet, glass moving elements carried by said flow regulating means for moving glass in a plane substantially at a right angle with the axis of the outlet when the flow regulating means is moved angularly about its axis, a rotary spindle carried by said flow regulating means, gearing connecting said spindle with said flow regulating means, whereby rotation of the spindle will cause angular movement of the flow regulating means, a pinion on said spindle, and a rack adjacent to said spindle for cooperating with said pinion when said flow regulating means moves axially to cause rotation of the spindle.

7. In glass feeding apparatus, a glass container having a submerged outlet, axially and angularly movable flow regulating means extending into the glass toward the outlet, glass moving elements carried by said flow regulating means for moving glass in a plane substantially at a right angle with the axis of the outlet when the flow regulating means is moved angularly about its axis, a rotary spindle carried by said flow regulating means, gearing connecting said spindle with said flow regulating means, whereby rotation of the spindle will cause angular movement of the flow regulating means, a pinion on said spindle, and a slide frame having a pair of spaced racks, each adapted when in engagement with said pinion to cause rotation of the spindle during axial movement of said flow regulating means, said frame being movable to place one of the racks in engagement with the pinion during movement of the flow regulating means away from the outlet and the other rack in engagement with the pinion during movement of the flow regulating means toward the outlet.

8. In glass feeding apparatus, a glass container having a submerged outlet, a plunger movable in the glass toward and from the outlet, a regulating tube surrounding said plunger and extending into the glass for controlling flow of glass to the outlet, and a rotary or angularly movable tube surrounding said regulating tube and having a portion extending into the glass and provided with means to stir the glass in the container when said last named tube is rotated or moved angularly about its axis.

9. In glass feeding apparatus, a glass container having a submerged discharge passage terminating at its lower end in an orifice, a vertically disposed rotary implement depending into the glass in substantially axial alignment with the orifice, and outstanding generally radial projections on the lower end portion only of said implement and spaced circumferentially thereof, said projections extending from the implement radially beyond the wall of the adjacent end portion of the discharge passage and being formed to actually push or impel molten glass in front of the same during the rotation of said implement.

10. In glass feeding apparatus, a glass container having a submerged outlet, an implement extending into the glass for regulating discharge of glass through the outlet, an angularly movable tube surrounding said implement and extending into the glass in the container, and glass moving means on the portion of the tube which extends into the glass.

11. In glass feeding apparatus, a glass container having a submerged discharge passage terminating at its lower end in an orifice, a tube extending into the glass in substantially axial alignment with said orifice, said tube being movable angularly about its axis, and means on the submerged portion of the tube extending radially beyond the wall of the adjacent end portion of said discharge passage and adapted on angular movement of the tube to move glass in the container in a plane substantially at a right angle with the axis of the tube.

12. In glass feeding apparatus, a glass container having a submerged outlet, an implement extending into the glass for regulating discharge of glass through the outlet, an angularly movable tube surrounding said implement and extending into the glass in the container, and means on the submerged portion of said tube for moving glass in the container in a plane substantially at a right angle with the axis of the implement when said tube is moved angularly about the axis of the implement.

13. In glass feeding apparatus, a glass container having a submerged outlet, an implement extending into the glass for regulating discharge of glass through the outlet, an angularly movable tube surrounding said implement and extending into the glass in the container, and a plurality of circumferentially spaced radial projections on the submerged portion of said tube adapted when the tube is rotated or moved angularly about its axis to move glass in the container in a plane substantially at a right angle with the axis of the outlet.

14. In glass feeding apparatus, a glass container having a submerged outlet, an implement extending into the glass for regulating discharge of glass through the outlet, an angularly movable tube surrounding said implement and extending into the glass in the container, and a plurality of circumferentially spaced radial projections on the submerged portion of said tube adapted when the tube is rotated or moved angularly about its axis to move glass in the container in a plane substantially at a right angle with the axis of the outlet, said tube being axially adjustable to vary the depth of the working position of said projections in the glass.

15. In glass feeding apparatus, a glass container having a submerged discharge passage terminating at its lower end in an orifice, a rotary implement extending into the glass in the container in substantially axial alignment with said orifice, and glass moving means carried by said implement and extending radially beyond the wall of the adjacent end portion of the discharge passage, said glass moving means being movable angularly about the axis of said implement on rotation of the latter to move glass in the container in a plane substantially at a right angle with the axis of said discharge passage.

16. In glass feeding apparatus, a glass container having a submerged discharge passage terminating at its lower end in an orifice, a rotary implement extending into the glass in the container in substantially axial alignment with said discharge passage, and a circular series of glass moving elements carried by the implement and extending into the glass in concentric relation to said implement, said glass moving elements extending radially from the implement beyond the wall of the adjacent end portion of said discharge passage and being movable angularly about the axis of said implement on rotation of the latter to move glass in the container in a plane substantially at a right angle with the axis of said discharge passage.

17. In glass feeding apparatus, a glass container having a submerged discharge passage terminating at its lower end in an orifice, a refractory implement extending into the glass in substantially axial alignment with the discharge passage for regulating discharge of glass through the orifice, a tubular refractory implement surrounding said first named implement and having a portion projecting into the glass, and generally radial glass engaging members on one of said refractory implements, said glass engaging members being spaced around the periphery of said implement and each extending radially outward beyond the wall of the adjacent end portion of said discharge passage.

Signed at London, England, this 3rd day of May, 1927.

THOMAS WARDLEY.